US006963430B2

(12) United States Patent
Matsui

(10) Patent No.: US 6,963,430 B2
(45) Date of Patent: Nov. 8, 2005

(54) IMAGE READING APPARATUS

(75) Inventor: Noriaki Matsui, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 787 days.

(21) Appl. No.: 09/909,877

(22) Filed: Jul. 23, 2001

(65) Prior Publication Data

US 2002/0054386 A1 May 9, 2002

(30) Foreign Application Priority Data

Jul. 25, 2000 (JP) ....................................... 2000-224495

(51) Int. Cl.[7] ........................... H04N 1/04; G03G 15/28

(52) U.S. Cl. ....................... 358/486; 358/461; 358/497; 358/496; 358/498; 399/205; 399/210; 399/212; 399/215

(58) Field of Search ................................ 358/486, 474, 358/498, 496, 461, 401, 497, 296; 399/205, 208, 210, 215, 211–213, 367; 250/234–236; 382/274, 312, 318, 319

(56) References Cited

U.S. PATENT DOCUMENTS

| | | | | |
|---|---|---|---|---|
| 4,870,501 A | | 9/1989 | Yoshida | 358/461 |
| 5,162,851 A | * | 11/1992 | Asakawa et al. | 399/208 |
| 5,239,341 A | * | 8/1993 | Ishida et al. | 399/85 |
| 5,325,210 A | | 6/1994 | Takashima et al. | 358/461 |
| 6,057,944 A | * | 5/2000 | Takeuchi | 358/468 |
| 6,081,682 A | * | 6/2000 | Sasaki et al. | 399/208 |

FOREIGN PATENT DOCUMENTS

| | | |
|---|---|---|
| JP | 58-23057 | 2/1983 |
| JP | 62-279782 | 12/1987 |
| JP | 4-275771 | 10/1992 |
| JP | 5-14609 | 1/1993 |
| JP | 9-62064 | 3/1997 |
| JP | 2000-115455 | 4/2000 |

* cited by examiner

*Primary Examiner*—Cheukfan Lee
(74) *Attorney, Agent, or Firm*—Fitzpatrick, Cella, Harper & Scinto

(57) ABSTRACT

An image reading apparatus which enables a reduction of FCOT by omitting a home position search and a shading compensation after an input of a reading instruction for a succeeding original when reading different originals successively.

6 Claims, 13 Drawing Sheets

IMAGE READING APPARATUS

BACKGROUND OF THE INVENTION

1. Field of the Invention

The present invention relates to an image reading apparatus.

2. Description of the Related Art

Conventionally, this type of image reading apparatus moves a scanner unit for scanning an original optically to perform a home position search for determining an initial position before an image reading operation and then moves the scanner unit to an original reading start position or performs a shading compensation for correcting an output of an optical sensor. Then, importance has been attached to how these operations should be completed fast to reduce a time period between an input of an image reading instruction and completion of an image data output (hereinafter, referred to as FCOT).

For example, the scanner unit is moved to a home position on opening or closing a pressure plate of an original reading apparatus to perform a shading compensation or the scanner unit is moved to the home position when an original is placed on an original feeder. In addition, Japanese Patent Application Laid-open No. 5-14609 discloses a plurality of home positions and changes a home position according to a magnification for reading, thereby reducing FCOT slightly.

Conventionally, however, a position setting for a home position or a shading compensation was always needed before reading an original and it was hard to reduce the time for the position setting or the shading compensation.

SUMMARY OF THE INVENTION

Therefore it is an object of the present invention to provide an image reading apparatus which enables a reduction of FCOT by omitting a home position search and a shading compensation after an input of a reading instruction for a succeeding original when reading different originals successively.

It is another object of the present invention to provide an image reading apparatus, comprising:

an original placement stand for placing an original;

scanning means for optically scanning the original placed on the original placement stand;

driving means for driving the scanning means along the original placement stand;

energizing means for energizing the driving means;

detecting means for detecting a position of the scanning means by backing or reciprocating the scanning means; and controlling means for controlling the position of the scanning means, wherein the controlling means stops the scanning means at a predetermined position after completion of scanning the original with the scanning means and the energizing means energizes the driving means for a predetermined time period so as to generate a braking force, and wherein the scanning means starts to scan the original from the predetermined position without detecting the position through the detecting means when an original reading instruction is inputted within the predetermined time period.

Other objects of the present invention will become apparent in the description which follow.

DESCRIPTION OF THE PREFERRED EMBODIMENTS

The preferred embodiments of the present invention will now be illustratively described in detail hereinafter with reference to the accompanying drawings.

Figure 1:
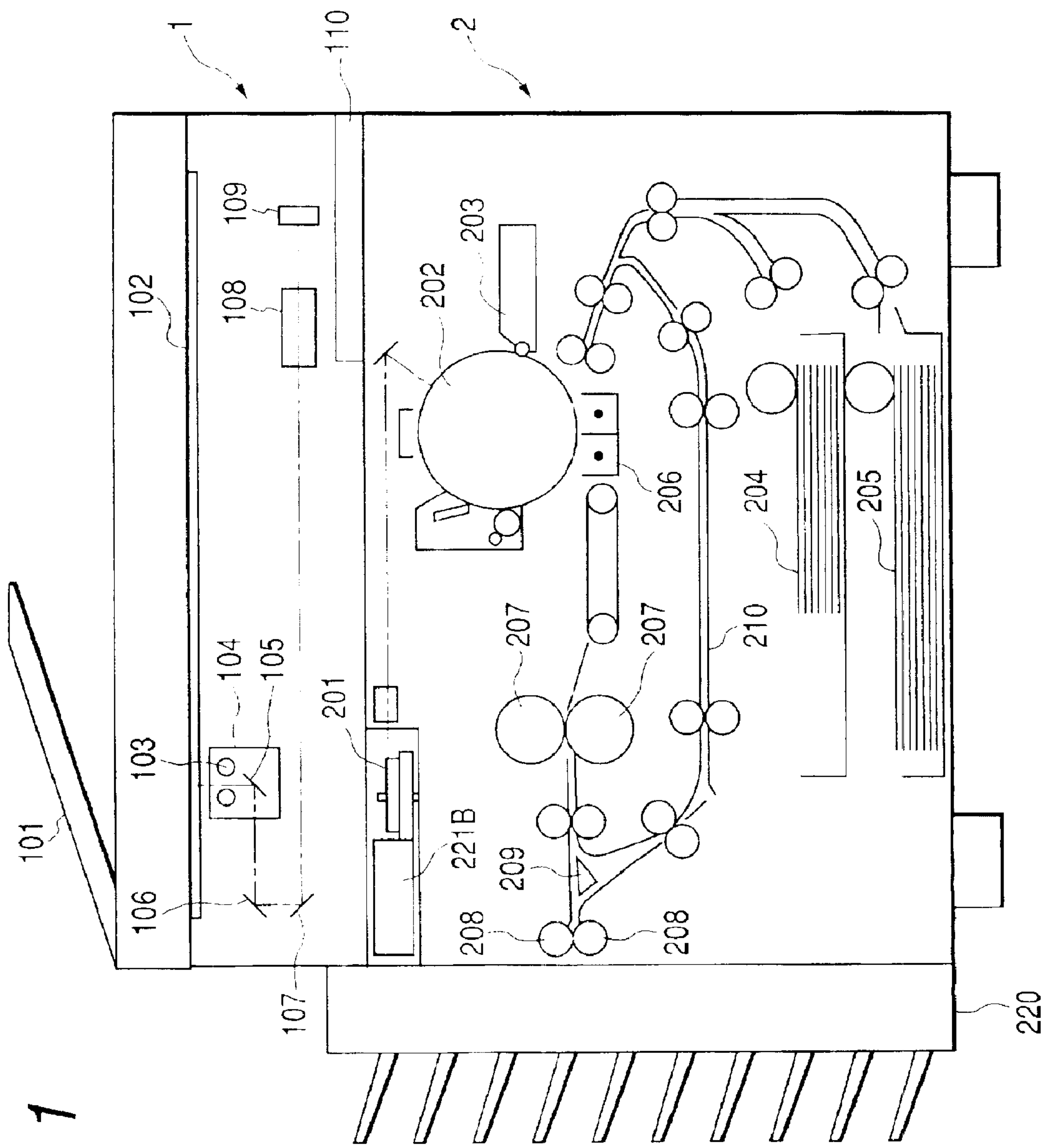
FIG. 1 is a diagram showing an example of a schematic sectional view of an image forming apparatus according to an embodiment.

Referring to FIG. 1, there is shown a schematic sectional view illustrating an entire configuration of the image forming apparatus. Hereinafter, a description is given about the configuration and a stationary-original reading operation on an original placement stand.

A reader portion 1 in the image forming apparatus is described first.

Originals placed on an auto original feeder (commonly called DF) 101 as original feeding means are sequentially fed onto an original glass stand surface 102 one by one. When the original is fed to a predetermined position of the glass surface 102, a lamp 103 in the scanner portion turns on and a scanner unit 104 as light source means moves to illuminate the original (unless the DF is used, a user directly sets the original on the original glass stand surface 102).

A reflected light from the original is incident on a CCD image sensor portion 109 (hereinafter, referred to as CCD) as photoelectric transfer means via mirrors 105, 106, and 107 and a lens 108. The reflected light from the original incident on the CCD 109 is photoelectrically transferred in this portion. The transferred electric signals are transmitted to an image process portion 110. In the image process portion 110, the original is submitted to an image process set on various operating portions.

Next, there is described a printer portion 2 as image forming means in the image forming apparatus.

In the image process portion 110, the electric signals connected to the printer portion 2 are converted into optical signals modulated by an exposure control portion 201 to irradiate a photosensitive member 202. A latent image formed on the photosensitive member 202 by the irradiation beams is developed by a developing device 203.

A sheet is fed by a sheet stacking portion 204 or a sheet stacking portion 205 at the same timing as for the developed image developed by the developing device and then the developed image is transferred onto the sheet in a transfer portion 206. The transferred image is fixed to the sheet by a fixing portion 207 and then delivered to an outside of the apparatus by a delivery portion 208. The sheet outputted from the delivery portion 208 is sorted by a sorter 22.

Subsequently, there is described a method of outputting sequentially-read images to two sides of a single output sheet. The output sheet to which the image is fixed by the fixing portion 207 is once fed to the delivery portion 208, the sheet feeding direction is reversed, and then the output sheet is fed to a re-feed sheet stacking portion 210 via a feeding direction switching member 209.

When a succeeding original is prepared, an original image is read in the same manner as in the above process, but the sheet is supplied by the re-feed sheet stacking portion 210 and therefore two original images can be outputted to a front side and a back side of the same output sheet finally.

Figure 2:
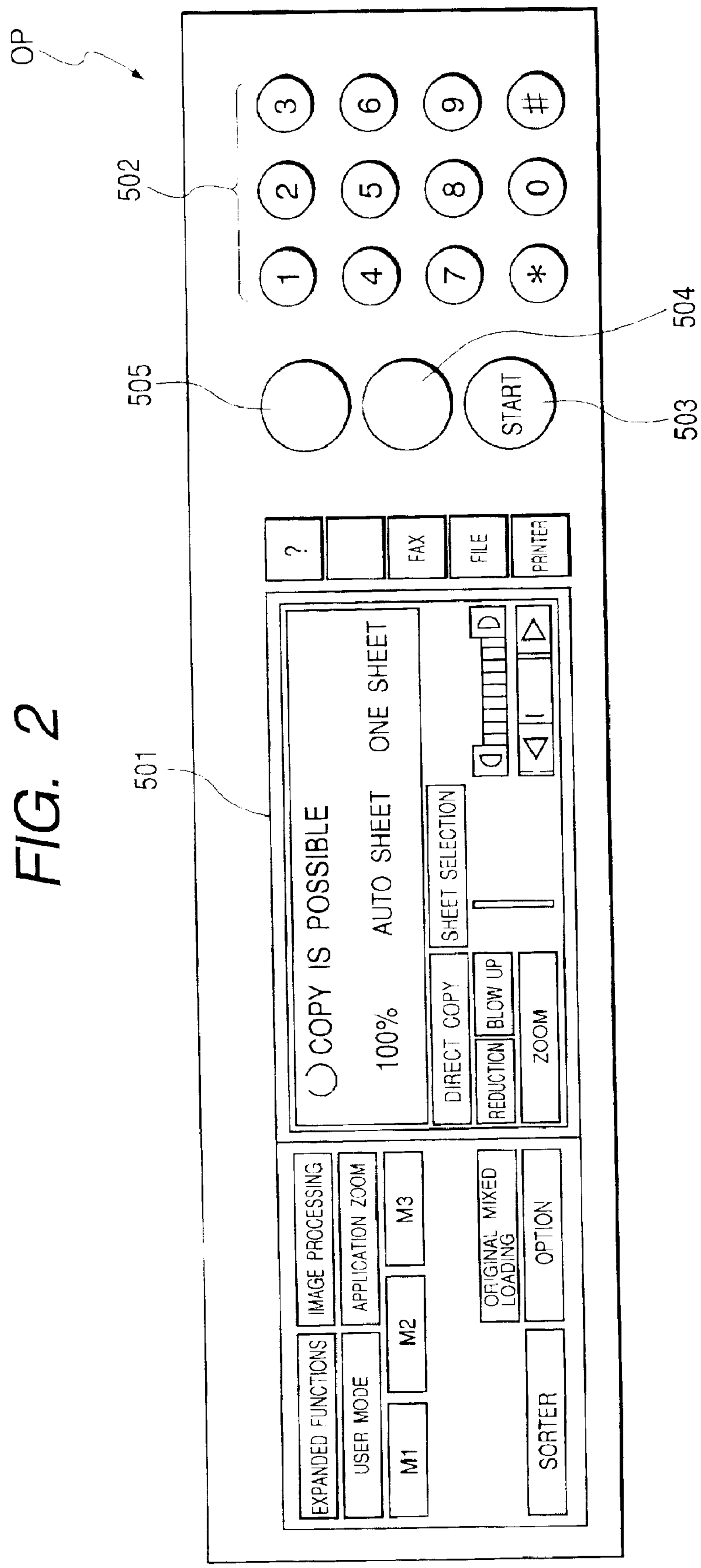
FIG. 2 is a diagram showing an example of an operating portion according to the embodiment.

Referring to FIG. 2, there is shown a plan view illustrating an example of an operation panel OP arranged in the reader portion 1 shown in FIG. 1.

In FIG. 2, there is shown a display portion 501 for displaying an operation status or a message. The display portion 501 has a touch panel on its surface, which functions as a selection key with a touch on the surface and a magnification is set on this portion. A ten key 502 is a key for inputting digits, where the number of copies for an original is set. A start key 503 is depressed to start an operation.

Figure 6:
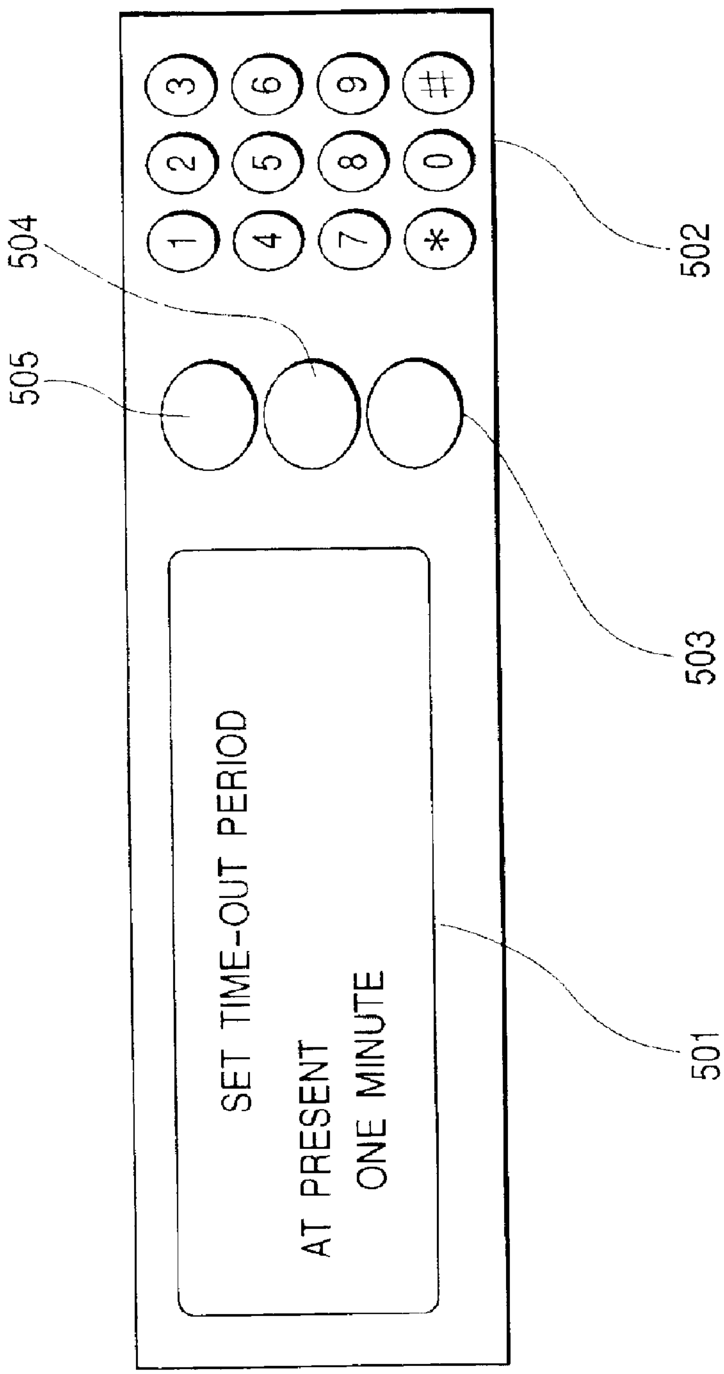
FIG. 6 is a diagram showing an example of a setting screen of an operating portion according to the embodiment.

By depressing a key 504, the display portion 501 changes to one as shown in FIG. 6, by which a time-out period from completion of the original reading process can be set or changed as a predetermined time after an image reading operation of the original (time setting means). The time-out period is preferably set from two or three sec for placing the original. To change this preset value, depress the ten key 502. Furthermore, by depressing the key 504 again, the display portion returns to the standard screen as shown in FIG. 2.

The time-out period is provided because a motor continuously energized in spite of no succeeding job causes wasted power consumption.

In the image forming apparatus as shown in FIG. 1, a polygon mirror 201 is rotated at a predetermined speed after completion of a single job. The polygon mirror takes a long time for a subsequent startup once the rotation is stopped, and therefore it is kept to rotate for a while so as to be ready to form an image when a succeeding job is entered. A time-out period to be set is preferably equal to or shorter than a standby time of the image forming apparatus main body.

Figure 14:
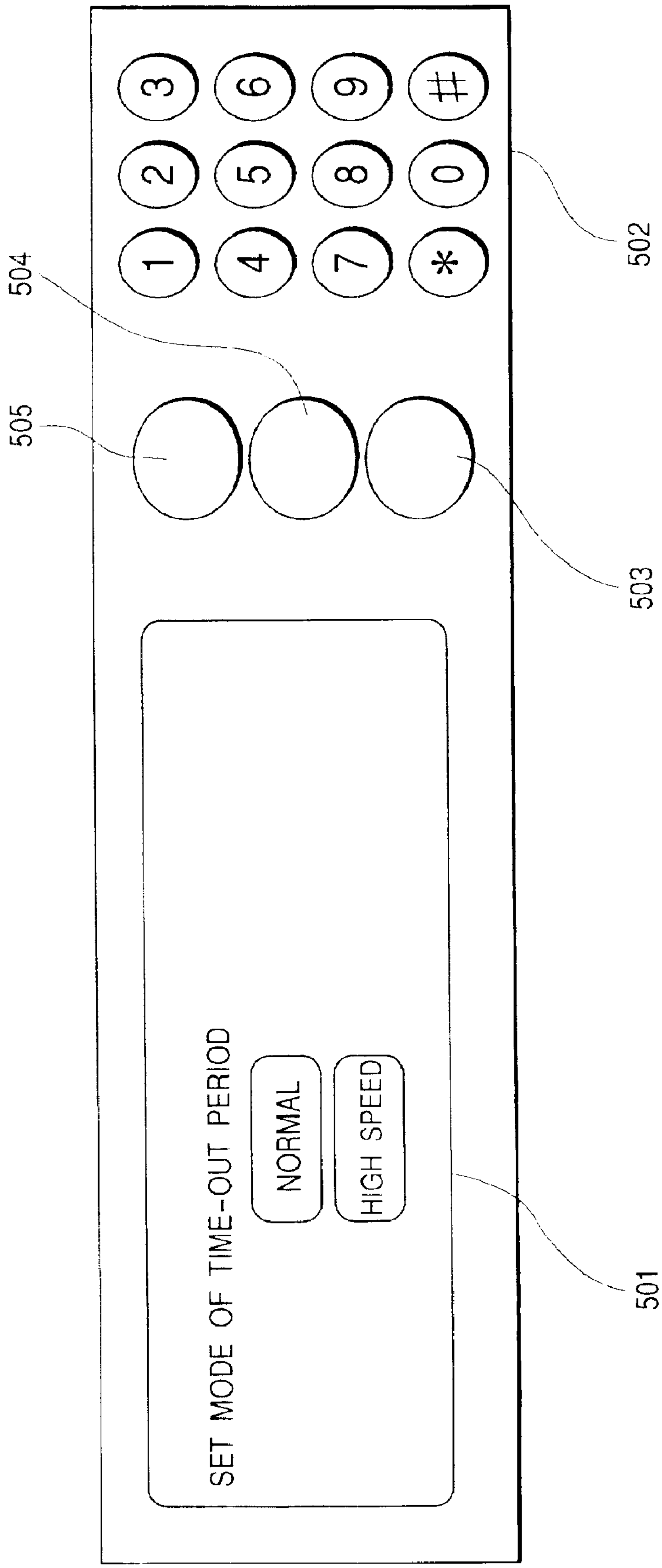
FIG. 14 is a diagram showing an example of a setting screen of the operating portion according to the embodiment.

The display portion 501 is changed as shown in FIG. 14 by depressing a key 505 and a mode of the time-out period can be set or changed by directly depressing a key within the display portion 501. As contents of its operation, this portion is used for classifying an operation of moving the scanner unit to the home position after the original reading operation by setting the mode of the time-out period. In this embodiment, the moving operation is classified into a normal mode and a high-speed mode.

The normal mode is used to move the scanner unit to the home position after completion of a previous job, to energize the optical motor so that the scanner unit is at rest, and to perform a shading compensation without performing a home position search at an input of the succeeding job before entering an image reading operation. The high-speed mode is further effective to reduce FCOT in comparison with the normal mode of the time-out period; in which the scanner unit is at rest by energizing the optical motor without performing the home position search after completion of the previous job and also in a succeeding job an original is read immediately without the home position search nor shading compensation. While an image quality without the home position search nor shading compensation is slightly inferior to an image quality submitted to the home position search or shading compensation, the high-speed mode is intended for users requiring a fast speed rather than the superior image quality.

The display portion returns to the standard screen in FIG. 2 by depressing the key 505 again.

Figure 3:
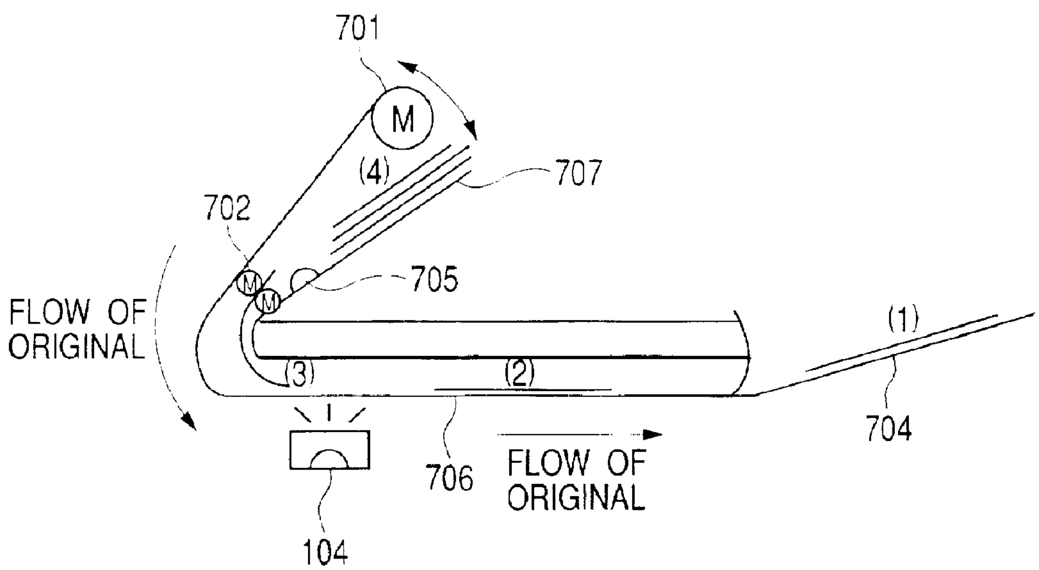
FIG. 3 is a schematic sectional view showing an example of reading an image using an original feeder according to the embodiment.
Figure 5:
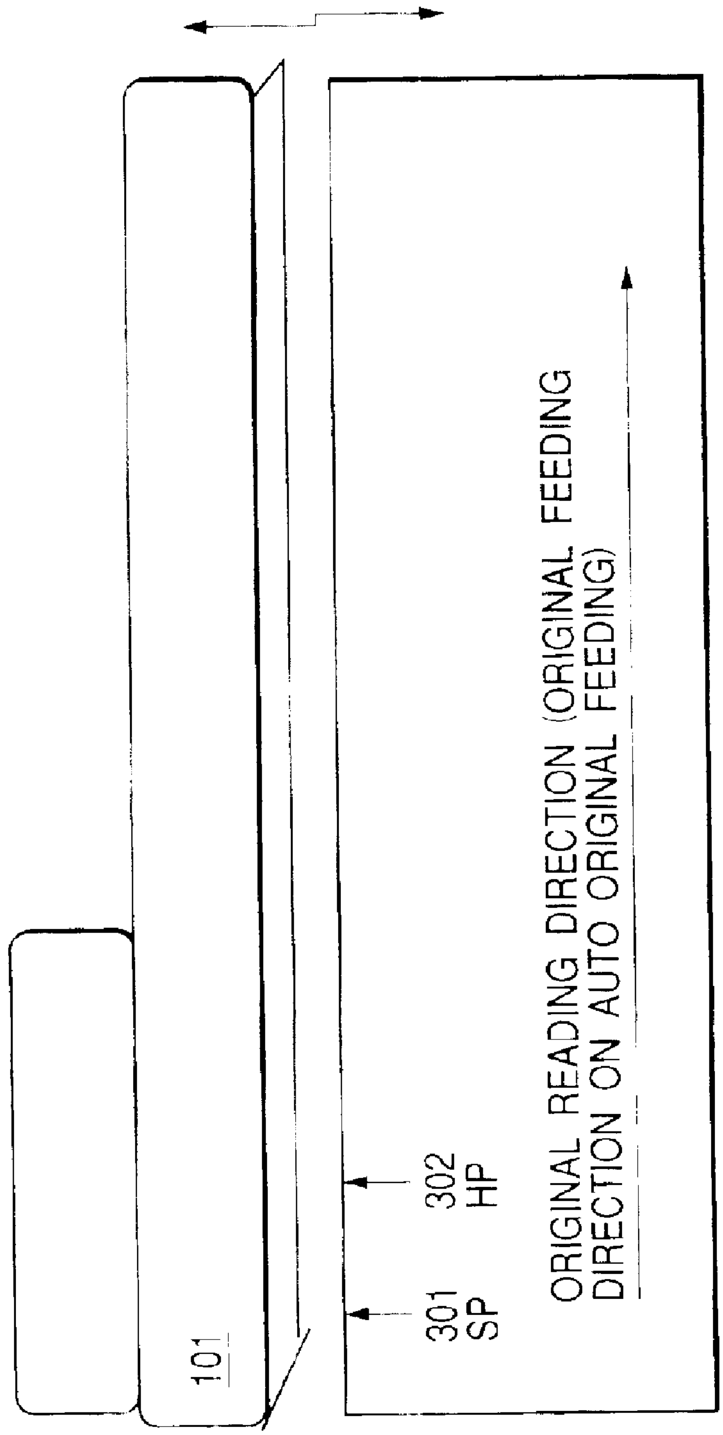
FIG. 5 is a schematic sectional view showing an example of the reader portion 1 shown in FIG. 1.

Subsequently, a DF flow-original reading is described below by using FIG. 3 and FIG. 5, with focusing on a paper flow.

To determine whether an original has been set on the DF original feed port 707, first, a sensor 705 detects its presence or absence. Next, a depression of the start key 503 on the operation panel OP causes the originals set on the original feeding portion 707 to be fed from the upper side.

The feeding operation is performed by dropping a pickup roller 701 on a surface of the original and subsequently taking an original scan timing with a registration roller 702. The scanner unit 104 turns on a lamp in the flow-original reading position (the SP position 301 in FIG. 5) to read the original with original feeding of the DF (=DF flow-original reading). Then, read originals are sequentially delivered to an original delivery port 704.

Figure 4:
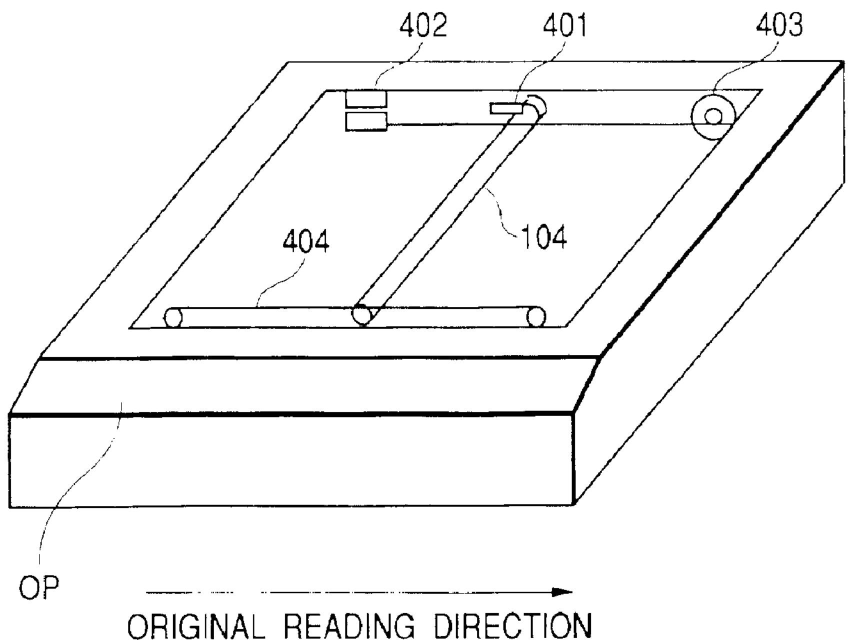
FIG. 4 is a schematic perspective view showing an example of a reader portion 1 except the original feeder shown in FIG. 1.

Referring to FIG. 4, there is shown a perspective view of an example of the reader portion 1 except the original feeder 101 shown in FIG. 1. In FIG. 4, a light shielding plate 401 is used for shielding from a home position sensor 402 and performs a home position search process which will be described later by determining a position of the scanner unit 104 according to whether an output of the home position sensor 402 is turned on or off and initializing the position for position setting (See FIG. 12).

The scanner unit 104 advances or backs by using an optical motor 403 with a pulse motor and a feeding belt 404. In FIG. 4, the original is read in a direction indicated by an arrow (=advance direction).

In the shading compensation, a white plate set under the home position is read with a lamp lit on in the home position (the home position 302 in FIG. 5) for an unevenness compensation of an output of the CCD 109. After the shading compensation process, the scanner unit 104 is moved (backed) to the SP position 301 in FIG. 5 for the original reading process.

Figure 13:
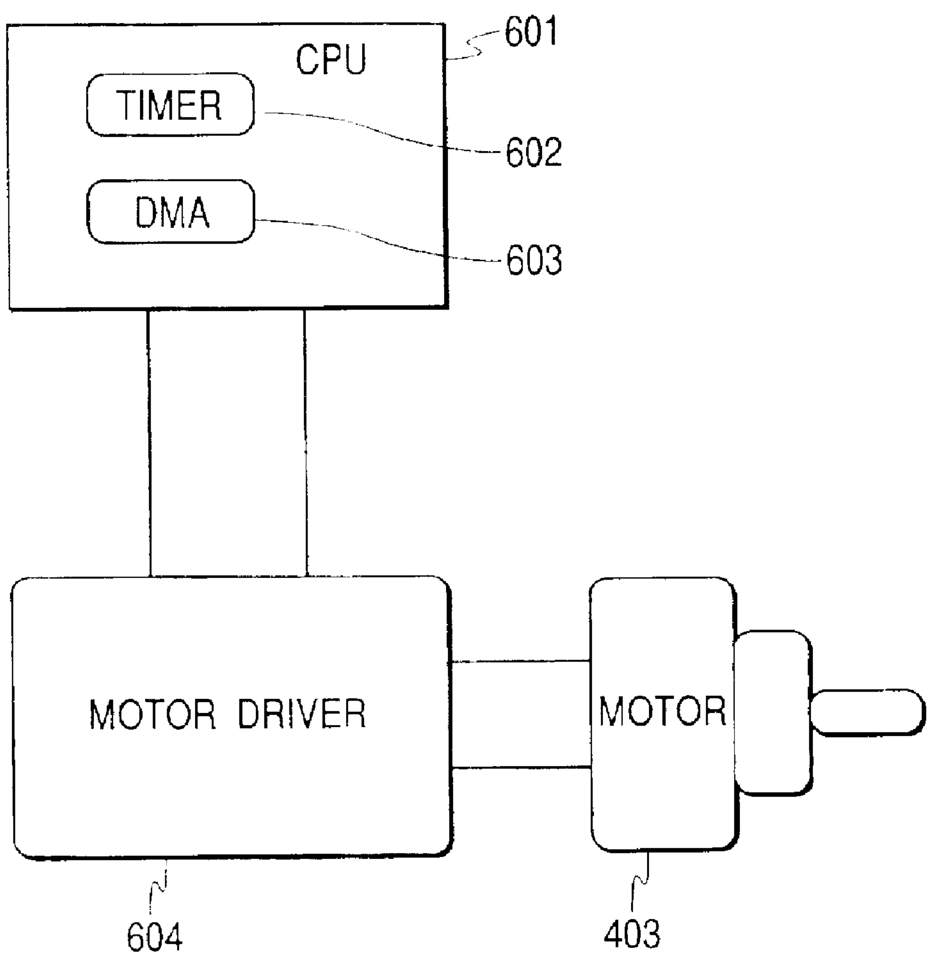
FIG. 13 is a block diagram of an optical motor portion according to the embodiment.

Next, scanner driving in an actual scanner unit 104 is described by using FIG. 13. A CPU 601 as control means is the heart of the reader portion 1 in FIG. 1 and controls driving pulses by using a timer 602 incorporated in the CPU 601 and a DMA (direct memory access) 603. Then, the generated driving pulses drive the optical motor 403 as driving means via a motor driver 604. The CPU 601 controls an energized state of the optical motor 403 in the time-out period mode. An advance or back direction of the scanner unit 104 is controlled by switching a hard port which is not shown by using software.

Figure 12:
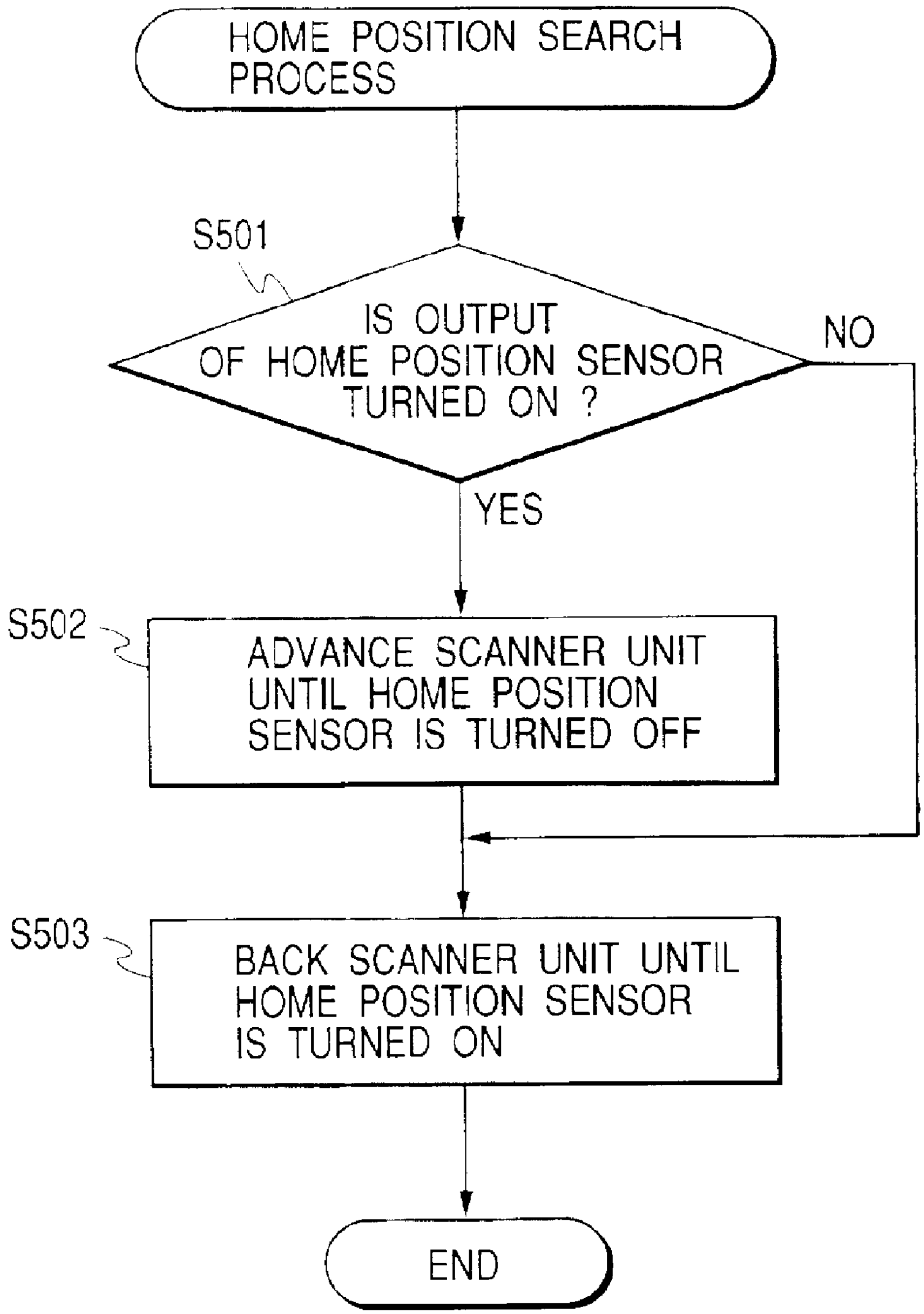
FIG. 12 is a flowchart of a home position search process according to the embodiment.

Subsequently, the above-mentioned home position search process will be described with reference to a flowchart in FIG. 12.

First, in step S501, it is determined whether an output of the home position sensor 402 is turned on. If the output of the home position sensor 402 is turned on in the judgment of S501, the scanner unit 104 is moved in the original reading direction (=the advance direction) until the output of the home position sensor 402 is turned off (S502).

If the output of the home position sensor 402 is turned off in the judgment of S501, the control progresses to step S503 in the same manner as for a process performed after S502, the scanner unit 104 is moved in the back direction in S503, and a required moving amount up to the home position as an initialization position is counted by using the DMA 603 after the output of the home position sensor 402 is turned on, by which the scanner unit moves to the home position 302 (S503).

Figure 7:
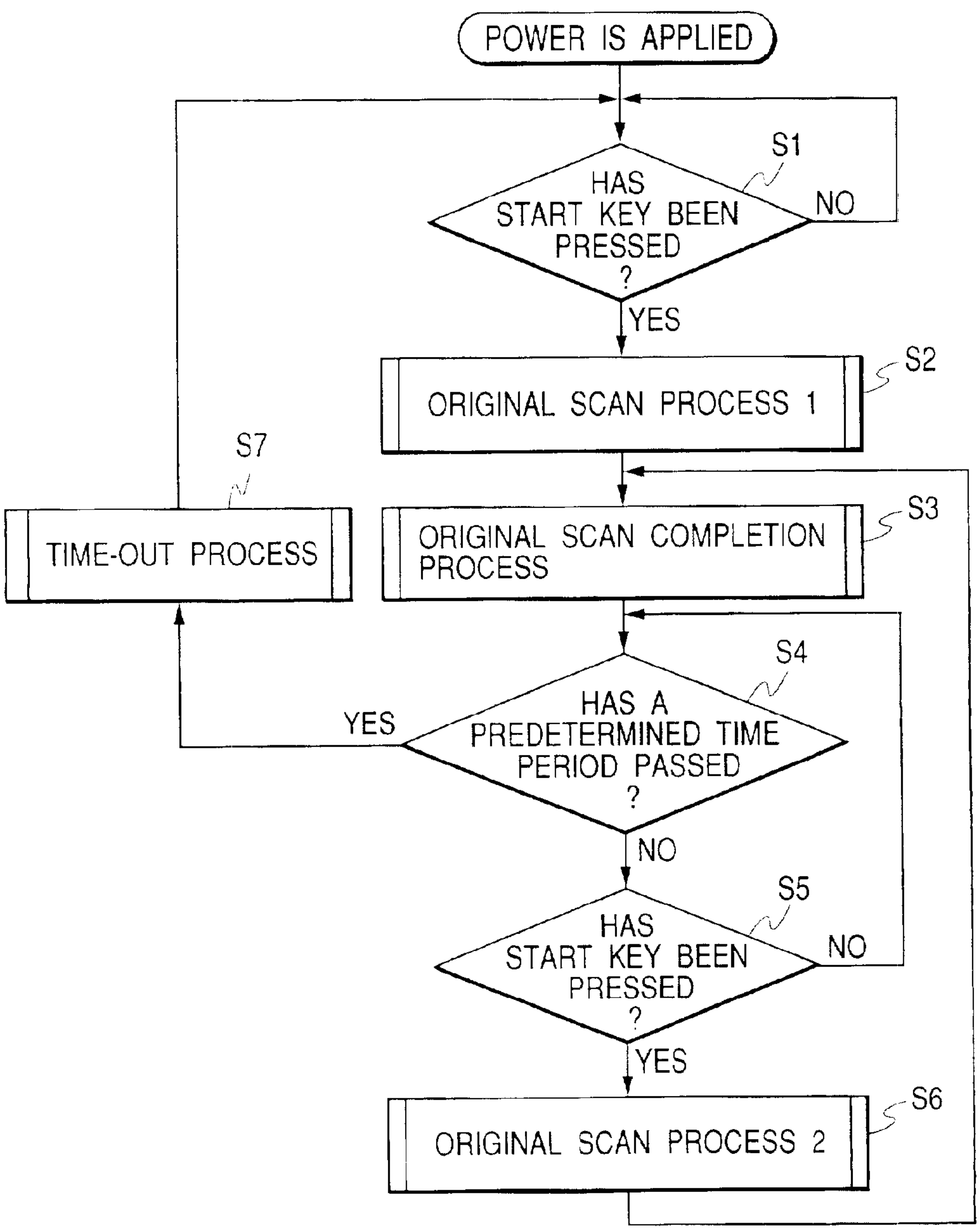
FIG. 7 is a flowchart of an original reading sequence process from turning on a power supply according to the embodiment.

Next, a description is given about an original reading sequence process after turning on the power supply by using a flowchart shown in FIG. 7.

A depression of the start key 503 on the operation panel OP is awaited in S1, first. At this time, the optical motor 403 is de-energized. If the start key 503 is recognized to be depressed in S1, the control progresses to S2 to execute an original scan process 1. The original scan process 1 is described later. After completion of the original scan process 1 in S2, the control progresses to S3 subsequently to execute an original scan completion process. The original scan completion process is described later.

After completion of the original scan completion process in S3, it is determined whether the start key 503 is depressed again before the time-out according to the preset value of the time-out period (S4, S5). If an occurrence of the time-out is considered in the judgment in S4, the control progresses to S7 to execute a time-out process. The time-out process is described later.

After completion of the time-out process, the control returns to S1 again. If the start key 503 is recognized to be depressed again before the time-out in the judgment in S5, the control progresses to S6 to execute an original scan process 2. Then, after completion of the original scan process 2 in S6, the control returns to S3 again.

Figure 8:
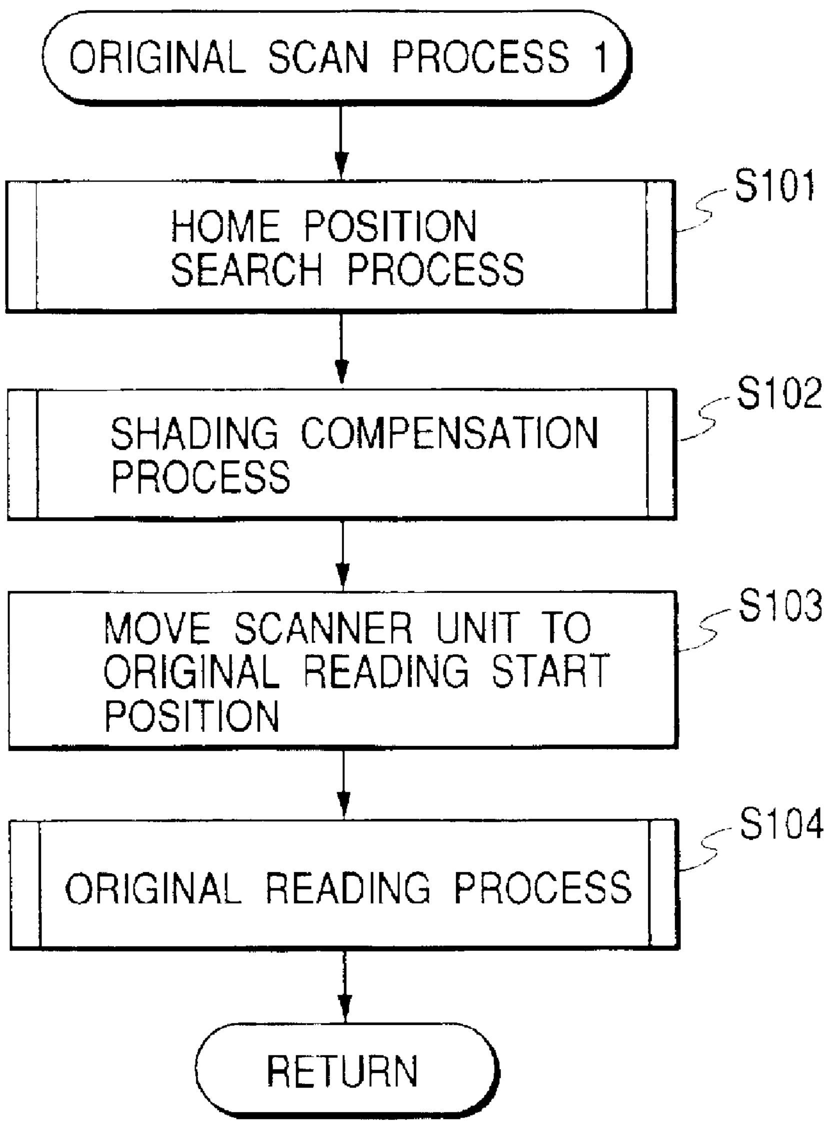
FIG. 8 is a flowchart of an original scan process 1 in step 2 according to the embodiment.

Next, the original scan process 1 is described by using a flowchart in FIG. 8.

First, in S101, the home position search process is performed. After completion of the home position search, the shading compensation process is performed (S102). After completion of the shading compensation process, the scanner unit 104 is moved to an original reading start position (SP position 301) (S103) to execute the original reading process (S104).

In the original reading process in the present embodiment, the original is read in one of the modes; the stationary-original reading mode in which a user directly sets the original on the original placement stand, the DF stationary-original reading in which the original is automatically fed to the original placement stand using the DF, and the flow-original reading mode using the DF. For example, if an original is set on the original feed port 707 on the DF, the original reading mode with the DF feed is automatically set and the process is automatically switched to the stationary-original reading mode or to the flow-original reading mode according to a designation of the original scan magnification.

Then, after completion of the process in S104, the control returns to the main flowchart in FIG. 7.

Figure 9:
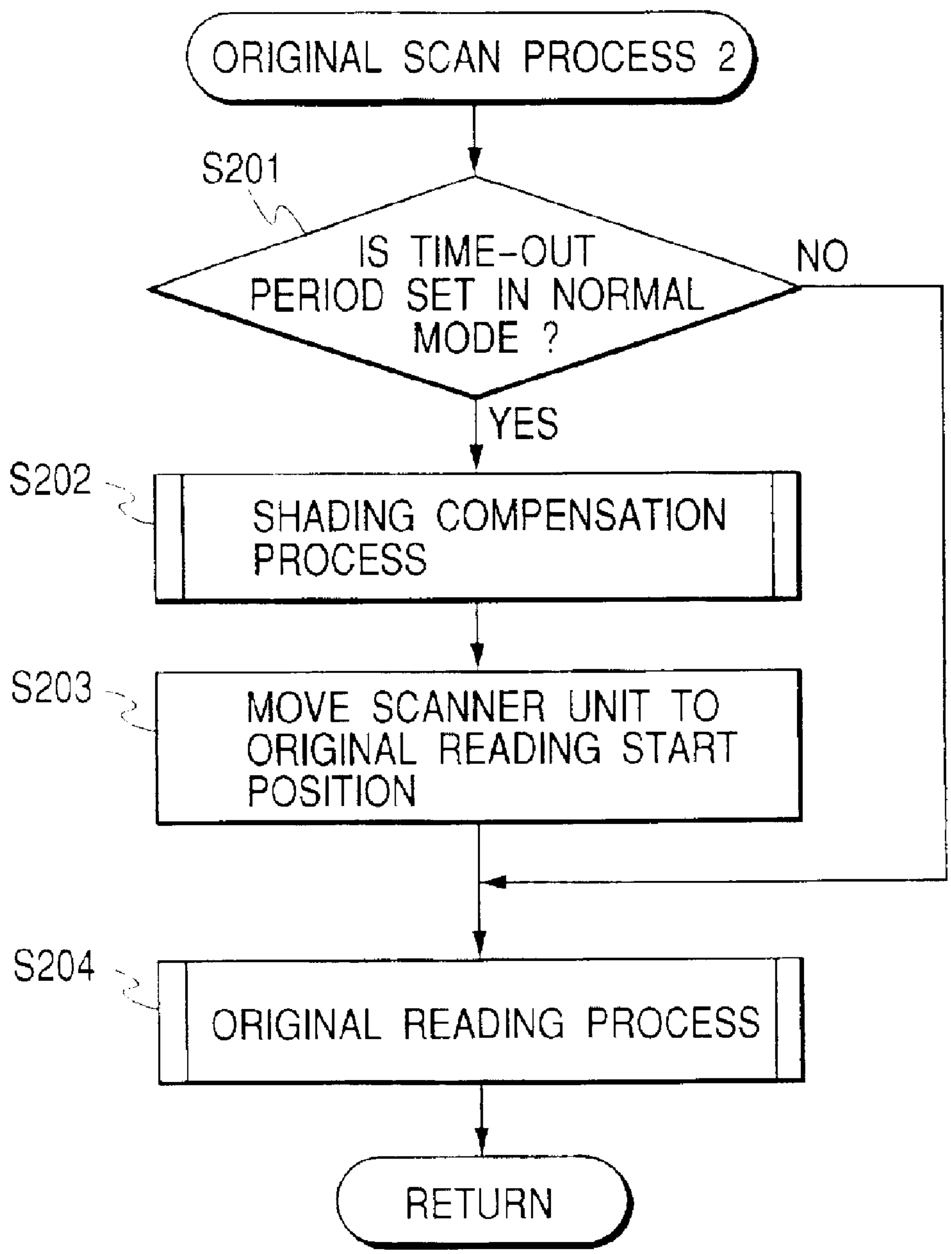
FIG. 9 is a flowchart of an original scan process 2 in step 6 according to the embodiment.

Next, the original scan process 2 is described by using a flowchart in FIG. 9.

First, in S201, it is determined whether the time-out period is set to the normal mode. If it is determined that the time-out period is set to the normal mode in the judgment in S201, subsequently the shading compensation process is performed (S202), and the scanner unit 104 is moved to the original reading start position (SP position 301) (S203) to perform an original reading process (S204).

Unless it is determined that the time-out period is set to the normal mode in the judgment in S201, the control progresses to S204 to start the original reading process immediately. After completion of the process in S204, the control returns to the main flowchart in FIG. 7.

Figure 10:
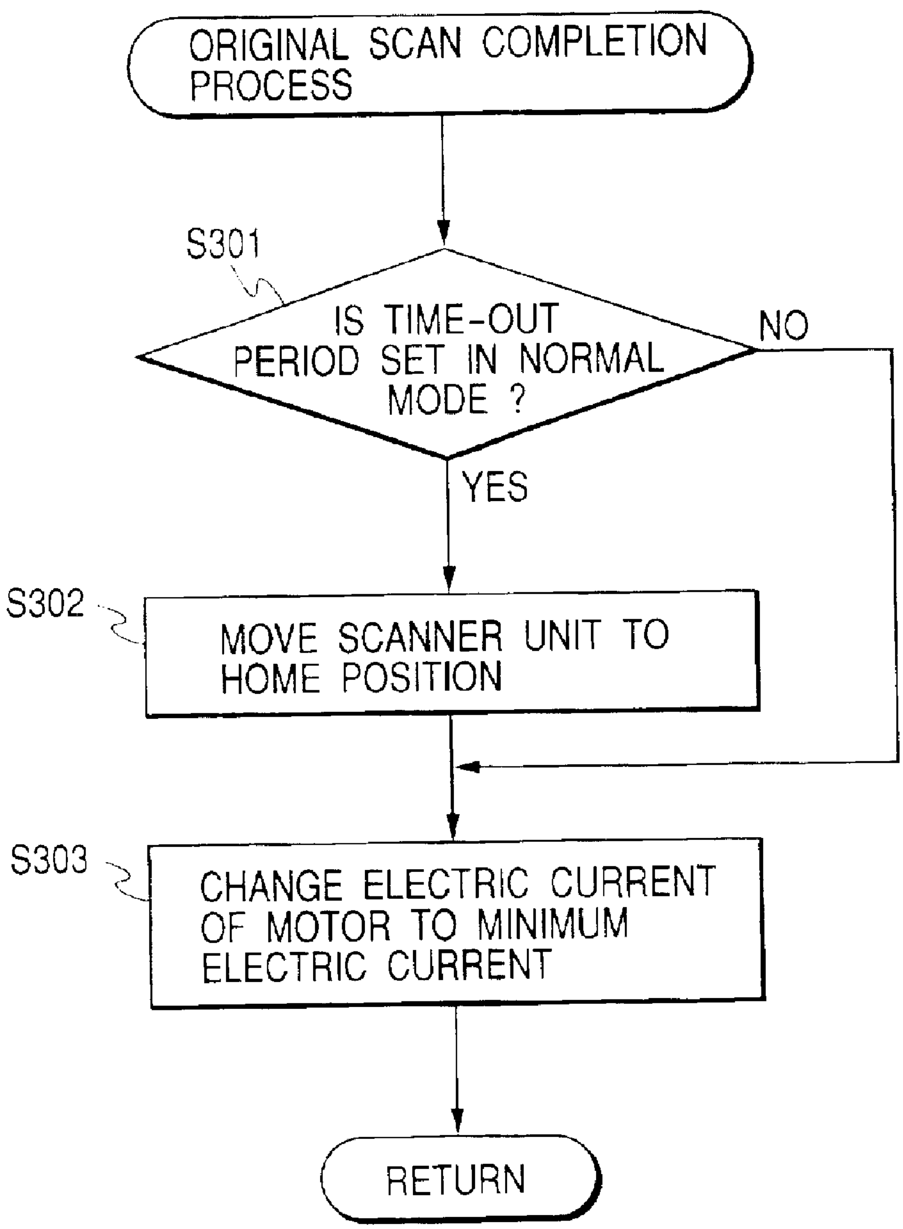
FIG. 10 is a flowchart of an original scan completion process in step 3 according to the embodiment.

Next, the original scan completion process is described by using a flowchart in FIG. 10.

First, in S301, it is determined whether the time-out period is set to the normal mode. If it is determined that the time-out period is set to the normal mode in the judgment in S301, the scanner unit 104 is moved to the home position (the home position 302) (S302). After completion of the process in S302, the electric current of the optical motor 403 is changed to the minimum electric current (S303).

Unless it is determined that the time-out period is set to the normal mode in the judgment in S301, the control progresses to S303 to change the electric current of the optical motor 403 to the minimum electric current and then to put the optical motor 403 in a standby state with being excited (S303).

While the pulse motor comprises several coils and a salient-pole rotor and rotates the rotor by successively inputting pulses to the coils, a concurrent input of pulses to the plurality of coils stops the pulse motor with being excited. This makes it possible to keep the scanner unit in a certain position.

After completion of the process in S303, the control returns to the main flowchart in FIG. 7.

Figure 11:
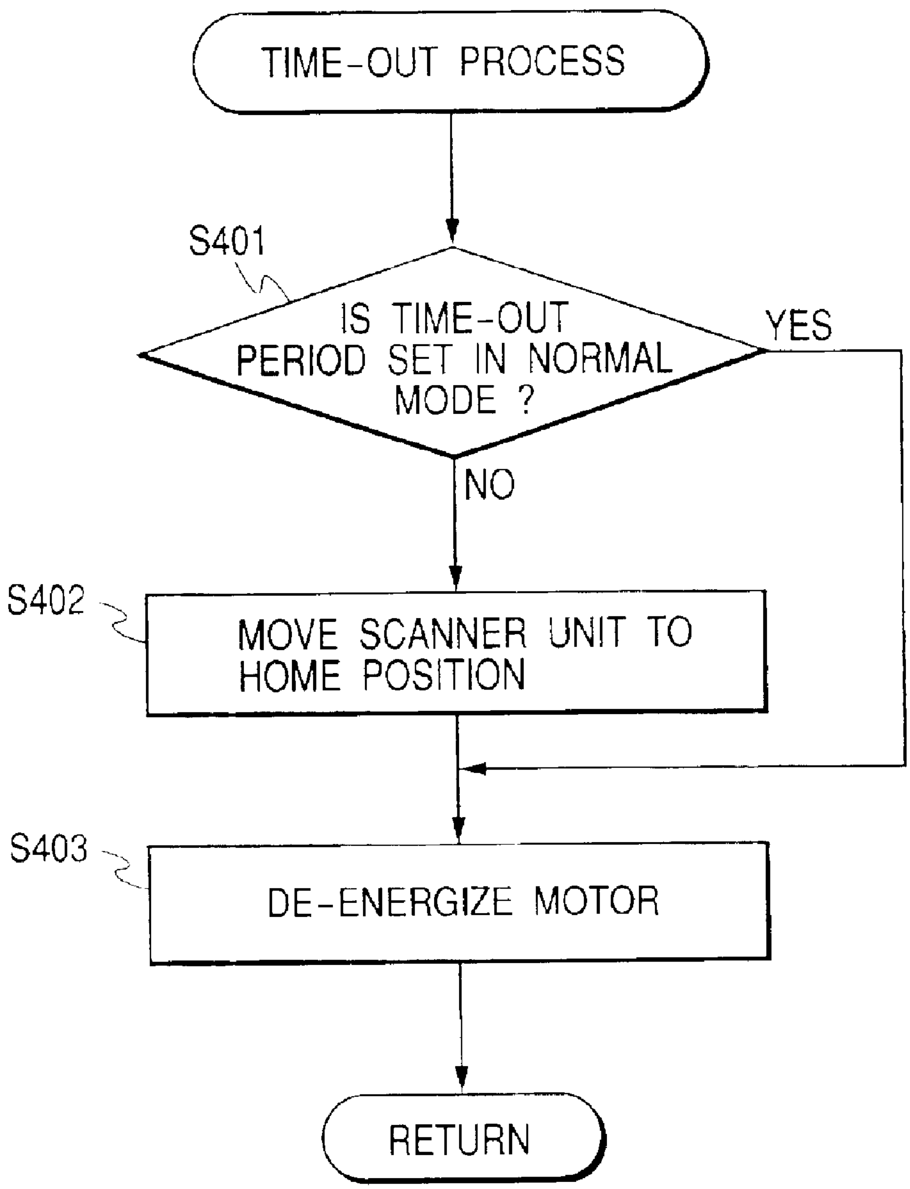
FIG. 11 is a flowchart of a time-out process in step 7 according to the embodiment.

Next, the time-out process is described by using a flowchart in FIG. 11.

First, in S401, it is determined whether the time-out period is set to the normal mode. Unless it is determined that the time-out period is set to the normal mode in the judgment in S401, the scanner unit 104 is moved to the home position (the home position 302) (S402). After the process in S402, the optical motor 403 is de-energized (S403).

If it is determined that the time-out period is set to the normal mode in the judgment in S401, the control progresses to step S403 to de-energize the optical motor 403. After completion of the process in S403, the control returns to the main flowchart in FIG. 7.

If there is an instruction of a succeeding image reading operation within the time-out period after setting the time-out period like the present embodiment, the succeeding image reading operation is executed without position setting through a home position search nor shading compensation after a succeeding image reading instruction, thereby enabling the apparatus to make full use of a performance higher than FCOT which is the product specification in continuous original reading operations in different jobs.

The dimensions, materials, and shapes of the components and their relative arrangement set forth in this embodiment should be appropriately changed according to a configuration of an apparatus to which the present invention is applied or various conditions and they are not intended to limit the scope of the present invention to the embodiments.

What is claimed is:

1. An image reading apparatus comprising:

a scanner unit which optically scans an original;

a drive unit which moves said scanner unit;

a mode setting unit which sets between a normal processing mode and a high-speed processing mode; and a controller, wherein when an operation of reading an image of the original has been completed, in said normal processing mode, said controller controls said drive unit to move said scanner unit to a home position, and thereafter sets an energized electric power of said drive unit at a minimum electric power, and keeps an energized state of said drive unit for a predetermined period of time, wherein when said controller is instructed to start a reading of an image of a succeeding original within the predetermined period of time, said controller performs a shading compensation for compensating an output of said scanner unit, and thereafter performs an operation of reading the image of the succeeding original, and in said high speed processing mode, said controller sets the energized electric power of said drive unit at the minimum electric power without moving said scanner unit to the home position, and keeps the energized state of said drive unit for the predetermined period of time, wherein when said controller is instructed to start the reading of the image of the succeeding original within the predetermined period of time, said controller performs the operation of reading the image of the succeeding original without performing the shading compensation.

2. An image reading apparatus according to claim 1, wherein when the predetermined period of time has elapsed, in said normal processing mode, said controller turns off an electric current to said drive unit, and in said high-speed processing mode, said controller controls said drive unit to move said scanner unit to the home position, and thereafter turns off the electric current to said drive unit.

3. An image reading apparatus according to claim 1, wherein when said controller is instructed to start a reading of an image of the original after an electric power is applied to said image reading apparatus, said controller controls said drive unit to move said scanner unit to perform a home position search to initialize a position of said scanner unit for position setting, and thereafter performs an operation of reading the image of the original.

4. An image reading apparatus according to claim 1, further comprising a time setting unit which sets the predetermined period of time.

5. An image forming apparatus comprising:

an image reading apparatus as recited in claim 1; and an image forming unit which records image information read by said image reading apparatus on a sheet.

6. A method of reading an image by using an image reading apparatus including a scanner unit which optically scans an original, a drive unit which moves said scanner unit, and a mode setting unit which sets between a normal processing mode and a high-speed processing mode, said method comprising:

when an operation of reading an image of the original has been completed in said normal processing mode, controlling said drive unit to move said scanner unit to a home position, and thereafter setting an energized electric power of said drive unit at a minimum electric power, and keeping an energized state of said drive unit for a predetermined period of time, wherein when instructed to start a reading of an image of a succeeding original within the predetermined period of time, performing a shading compensation for compensating an output of said scanner unit, and thereafter performing an operation of reading the image of the succeeding original, and when the operation of reading the image of the original has been completed in said high-speed processing mode, setting the energized electric power of said drive unit at the minimum electric power without moving said scanner unit to the home position, and keeping the energized state of said drive unit for the predetermined period of time, wherein when instructed to start the reading of the image of the succeeding original within the predetermined period of time, performing the operation of reading the image of the succeeding original without performing the shading compensation.

* * * * *

UNITED STATES PATENT AND TRADEMARK OFFICE

CERTIFICATE OF CORRECTION

PATENT NO. : 6,963,430 B2
DATED : November 8, 2005
INVENTOR(S) : Noriaki Matsui

It is certified that error appears in the above-identified patent and that said Letters Patent is hereby corrected as shown below:

Column 1,
Line 15, "fast" should read -- quickly --.
Line 61, "description" should read -- descriptions --.

Column 3,
Line 41, "sec" should read -- seconds --.

Signed and Sealed this

Twenty-fifth Day of April, 2006

JON W. DUDAS
*Director of the United States Patent and Trademark Office*